US012785849B2

(12) United States Patent
Qu et al.

(10) Patent No.: US 12,785,849 B2
(45) Date of Patent: Nov. 3, 2026

(54) SIGNAL GENERATION METHOD, SIGNAL PROCESSING METHOD, AND RELATED DEVICE

(71) Applicant: HUAWEI TECHNOLOGIES CO., LTD., Shenzhen (CN)

(72) Inventors: Weilin Qu, Beijing (CN); Yiling Wu, Beijing (CN); Jun Chen, Chengdu (CN); Yujian Tang, Chengdu (CN); Mao Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 18/495,878

(22) Filed: Oct. 27, 2023

(65) Prior Publication Data

US 2024/0056217 A1 Feb. 15, 2024

Related U.S. Application Data

(63) Continuation of application No. PCT/CN2022/086277, filed on Apr. 12, 2022.

(30) Foreign Application Priority Data

Apr. 30, 2021 (CN) ......................... 202110483718.0

(51) Int. Cl.
*H04L 1/00* (2006.01)
*H04L 1/08* (2006.01)

(52) U.S. Cl.
CPC .......... *H04L 1/0041* (2013.01); *H04L 1/0057* (2013.01); *H04L 1/08* (2013.01)

(58) Field of Classification Search
CPC . H04L 1/00; H04L 1/003; H04L 1/004; H04L 1/0041; H04L 1/0045; H04L 1/005;
(Continued)

(56) References Cited

U.S. PATENT DOCUMENTS 5,506,862 A 4/1996 McIntosh
6,192,068 B1 2/2001 Fattouche et al.
(Continued)

FOREIGN PATENT DOCUMENTS

CN 1375969 A 10/2002
CN 101827050 A 9/2010
(Continued)

OTHER PUBLICATIONS

Specification for RFID Air Interface. EPC Radio-Frequency Identity Protocols Class-1 Generation-2 UHF RFID Protocol for Communications at 860 MHz-960 MHz Version 1.2.0. Oct. 23, 2008, total 108 pages.

(Continued)

*Primary Examiner* — Warner Wong

(57) ABSTRACT

A signal generation method is disclosed, to enhance an anti-interference capability and a coverage area of a signal. The method includes: A first device obtains a first signal based on transmission information through channel encoding, where the transmission information includes information that the first device needs to send to a second device; the first device generates a second signal based on the first signal through repetition or frequency spread transformation; the first device generates a third signal based on the second signal through linear encoding; and the first device generates a target signal based on the third signal through signal modulation, where the target signal is sent to the second device. Associated devices are also described.

19 Claims, 11 Drawing Sheets

(58) Field of Classification Search

CPC ... H04L 1/0056; H04L 1/0057; H04L 1/0058; H04L 1/0033; H04L 1/0036; H04L 1/009; H04L 1/0091; H04L 13/00; H04L 13/16; H04L 13/18; H04L 25/00343; H04L 25/03286; H04L 27/04; H04L 27/06; H04L 27/12; H04L 27/14; H04L 27/20; H04L 27/22; H04L 27/36; H04L 27/38; H04L 27/2627; H04L 27/2647; H04L 27/2649; H04L 27/26544; H04L 27/366; H04L 2027/0024; H04L 1/0042; H04L 1/08; H04L 1/1819; H04L 67/1095; H04L 12/40176

See application file for complete search history.

(56) References Cited

U.S. PATENT DOCUMENTS

| | | | | |
|---|---|---|---|---|
| 2009/0022237 | A1* | 1/2009 | Wang | H04L 1/0071 375/260 |
| 2010/0172433 | A1* | 7/2010 | Li | H04L 1/0026 375/295 |
| 2010/0281329 | A1* | 11/2010 | Yokokawa | H03M 13/6555 714/752 |
| 2010/0303126 | A1 | 12/2010 | Wu et al. | |
| 2014/0086347 | A1* | 3/2014 | Kang | H04L 27/08 375/259 |
| 2014/0126657 | A1* | 5/2014 | Nakasendo | G11B 20/10287 375/259 |
| 2015/0003499 | A1 | 1/2015 | Boutillon et al. | |
| 2016/0072526 | A1* | 3/2016 | Cheng | H03M 13/27 714/776 |
| 2016/0127046 | A1* | 5/2016 | Zhang | H04L 27/183 398/188 |
| 2017/0331589 | A1* | 11/2017 | Jang | H04L 1/0045 |
| 2018/0091174 | A1* | 3/2018 | Hof | H03M 13/353 |
| 2019/0158226 | A1* | 5/2019 | Hui | H04L 1/0041 |
| 2020/0036474 | A1* | 1/2020 | Luo | H04L 5/0037 |
| 2020/0067529 | A1* | 2/2020 | Hui | H04L 1/0065 |
| 2021/0013901 | A1* | 1/2021 | Li | H03M 13/616 |
| 2021/0111740 | A1* | 4/2021 | Nammi | H03M 13/251 |
| 2022/0029638 | A1* | 1/2022 | Kim | H03M 13/6306 |
| 2022/0052711 | A1* | 2/2022 | Wang | H04L 1/0057 |
| 2022/0069842 | A1* | 3/2022 | Jeon | H03M 13/11 |
| 2022/0200634 | A1* | 6/2022 | Xu | H03M 13/6362 |
| 2023/0208554 | A1* | 6/2023 | Wang | H04L 1/0052 370/329 |
| 2023/0422308 | A1* | 12/2023 | Lee | G06N 3/084 |

FOREIGN PATENT DOCUMENTS

| | | | | |
|---|---|---|---|---|
| CN | 102073886 | A | 5/2011 | |
| CN | 103427917 | A | 12/2013 | |
| CN | 108092691 | A | 5/2018 | |
| CN | 110007325 | A | 7/2019 | |
| CN | 111130594 | A | 5/2020 | |
| WO | WO-0207372 | A2 * | 1/2002 | H04L 1/18 |

OTHER PUBLICATIONS

Extended European Search Report for Application No. 22794579.7 dated Sep. 12, 2024, 9 pages.

Chinese Office Action for Application No. 202110483718 dated Jul. 10, 2023, 9 pages.

* cited by examiner

SIGNAL GENERATION METHOD, SIGNAL PROCESSING METHOD, AND RELATED DEVICE

CROSS-REFERENCE TO RELATED APPLICATIONS

This application is a continuation of International Application No. PCT/CN2022/086277, filed on Apr. 12, 2022, which claims priority to Chinese Patent Application No. 202110483718.0, filed on Apr. 30, 2021. The disclosures of the aforementioned applications are hereby incorporated by reference in their entireties.

TECHNICAL FIELD

This disclosure relates to a signal processing method, and in particular, to a signal generation method, a signal processing method, and a wireless communication device.

BACKGROUND

With development of wireless communication technologies, radio signal transmission between wireless communication devices is increasingly frequent. On one hand, people's daily life and work are convenient, and a wireless communication device can implement more and more functions. On the other hand, a wireless communication device in an area sends and receives more and more radio signals, and difficulty of sending and receiving the radio signals by the wireless communication device is greatly increased.

In a current wireless communication system, a first wireless communication device generates a signal by encoding information that needs to be sent, and then modulates the signal and sends the modulated signal to another wireless communication device. Then, a second wireless communication device that receives the modulated signal obtains the signal through demodulation, to receive the information sent by the first wireless communication device. For example, in a current radio frequency identification (RFID) communication system, information may be transmitted between an electronic tag and a reader/writer. The electronic tag sends one response signal to the reader/writer over a reflection link. The electronic tag may generate, based on a selected linear code and by using the linear code for linear code modulation and amplitude shift keying (ASK) modulation, one response signal that can be sent, and then the electronic tag sends the response signal to the reader/writer. Correspondingly, after receiving the response signal sent by the electronic tag, the reader/writer obtains the linear code through signal demodulation, to obtain information sent by the electronic tag.

In a current RFID system, when generating a response signal that is to be sent, a wireless communication device simply generates the signal that is to be sent through a manner of linear encoding and signal modulation. An anti-interference capability of the signal generated in this manner is weak, so that a signal transmission distance is severely limited. In addition, when a plurality of wireless communication devices simultaneously send signals, severe signal superimposition and mutual interference between signals are caused. It is difficult for a wireless communication device at a receive end to receive the response signal and correctly demodulate signals sent by a plurality of electronic tags.

SUMMARY

Embodiments of this disclosure provide a signal generation method, a signal processing method, and a wireless communication device, to enhance an anti-interference capability and a coverage area of a target signal.

A first aspect of embodiments of this disclosure provides a signal generation method, where the method is applied to signal transmission between wireless communication devices in a wireless communication system. The method includes: When a first device needs to send some information to a second device, the first device includes the information that needs to be sent into one piece of transmission information. The first device obtains, based on the transmission information that needs to be sent, a first signal through channel encoding. The transmission information includes the information that the first device needs to send to the second device. Then, the first device generates, based on the first signal, a second signal through repetition or frequency spread transformation, where the second signal includes a plurality of information blocks. Then, the first device generates, based on the second signal, third information through linear encoding. Finally, the first device generates a target signal based on the third signal, where the target signal is sent to the second device. Because the target signal carries the information that the first device needs to send to the second wireless communication device, the second device may determine, based on the received target signal, the information sent by the first device.

In this possible implementation, the target signal is generated based on the second signal obtained through the frequency spread transformation, and the frequency spread transformation enables the second signal to have a wider information bandwidth than the transmission information before the frequency spread transformation. Therefore, the target signal also has a wider information bandwidth. In this way, the target signal is enabled to have a strong anti-interference capability, and a transmission distance of the target signal is greatly increased. In addition, because different spreading codes are used for different signals during the frequency spread transformation, a wireless communication device that receives the target signal can distinguish between different signals based on the different spreading codes. This effectively improves efficiency of receiving different signals by the wireless communication device at the same time.

In a possible implementation of the first aspect, that the first device obtains, based on the transmission information, the first signal through the channel encoding includes: The first device obtains, based on the transmission information, the first signal prestored by the first device, through the channel encoding; or the first device generates, based on the transmission information, the first signal online through the channel encoding.

In this possible implementation, before performing frequency spread transformation, the first device further performs channel transformation on the transmission information. Redundant information used for error correction is added during channel encoding transformation. Therefore, after receiving the target signal, the second device that receives the target signal may determine, based on the redundant information in the channel encoding and corresponding decoding information, whether the received target information has an error and a location of the error, and may perform error correction, to ensure information transmission reliability, reduce an information transmission error, and improve signal transmission quality.

In a possible implementation of the first aspect, the second signal includes the plurality of information blocks, and that the first device generates, based on the first signal, a second signal through repetition or frequency spread transformation includes: The first device generates a plurality of same information blocks or a plurality of same information bits based on at least one information block or information bit in the first signal and a determined quantity of repetition times; or the first device generates a plurality of same information blocks or a plurality of same information bits based on at least one information block or information bit in the first signal and a determined quantity of repetition times, and the first device multiplies the plurality of same information blocks or the plurality of same information bits by a first spreading code, to generate the second signal.

In this possible implementation, before performing frequency spread transformation, the first device further performs repetition on each information block in the second signal based on the determined quantity of repetition times. This increases a possibility that the second device can also restore a lost information block based on the repetition, so that the information transmission reliability is ensured and the signal transmission quality is improved.

In a possible implementation of the first aspect, that the first device generates, based on the second signal, a third signal through linear encoding includes: The first device generates, based on the second signal and a linear code, the third signal through the linear encoding.

In a possible implementation of the first aspect, generating the target signal based on the third signal includes: The first device performs signal modulation on the third signal, and then the first device generates, based on the third signal on which the signal modulation is performed and a second spreading code, the target signal through frequency spread transformation.

In this possible implementation, when generating the target signal, the first device performs frequency spread transformation again, so that an anti-interference capability of the target signal is enhanced again, and a transmission distance of the target signal is greatly increased. In addition, because different spreading codes are used for different signals during frequency spread transformation, a wireless communication device that receives the target signal can distinguish between different signals based on the different spreading codes. This effectively improves efficiency of receiving different signals by the wireless communication device at the same time.

A second aspect of embodiments of this disclosure provides a signal processing method, where the method is applied to signal transmission between wireless communication devices in a wireless communication system. The method includes: A second device determines a third signal based on a target signal through signal demodulation, where the target signal is sent by a first device; the second device determines a second signal based on the third signal through linear decoding; the second device determines a first signal based on the second signal through de-repetition or frequency despread transformation; and the second device determines transmission information based on the first signal through channel decoding, where the transmission information includes information that the first device needs to send to the second device.

In this possible implementation, the target signal is generated based on the first signal obtained through the frequency spread transformation, and the frequency spread transformation enables the first signal to have a wider information bandwidth than the transmission information before the frequency spread transformation. Therefore, the target signal also has a wider information bandwidth. In this way, the target signal is enabled to have a strong anti-interference capability, and a transmission distance of the target signal is greatly increased. In addition, because different spreading codes are used for different signals during the frequency spread transformation, the second device that receives the target signal can distinguish between different signals based on the different spreading codes. This effectively improves efficiency of receiving different signals by the second device at the same time.

A third aspect of this disclosure provides a wireless communication device. The wireless communication device has a function of implementing the method in any one of the first aspect or the possible implementations of the first aspect. The function may be implemented by hardware, or may be implemented by hardware executing corresponding software. The hardware or the software includes one or more modules corresponding to the foregoing function, for example, a frequency spread module.

A fourth aspect of this disclosure provides a wireless communication device. The wireless communication device has a function of implementing the method in any one of the second aspect or the possible implementations of the second aspect. The function may be implemented by hardware, or may be implemented by hardware executing corresponding software. The hardware or the software includes one or more modules corresponding to the foregoing function, for example, a frequency despread module.

A fifth aspect of this disclosure provides a wireless communication device. The wireless communication device includes at least one processor, a memory, an input/output (I/O) interface, and computer-executable instructions that are stored in the memory and that can be run on the processor. When the computer-executable instructions are executed by the processor, the processor performs any one of the first aspect or the possible implementations of the first aspect.

A sixth aspect of this disclosure provides a wireless communication device. The wireless communication device includes at least one processor, a memory, an input/output (I/O) interface, and computer-executable instructions that are stored in the memory and that can be run on the processor. When the computer-executable instructions are executed by the processor, the processor performs any one of the second aspect or the possible implementations of the second aspect.

A seventh aspect of this disclosure provides a computer-readable storage medium storing one or more computer-executable instructions. When the computer-executable instructions are executed by a processor, the processor performs the method in any one of the first aspect or the possible implementations of the first aspect.

An eighth aspect of this disclosure provides a computer-readable storage medium storing one or more computer-executable instructions. When the computer-executable instructions are executed by a processor, the processor performs the method in any one of the second aspect or the possible implementations of the first aspect.

A ninth aspect of this disclosure provides a computer program product storing one or more computer-executable instructions. When the computer-executable instructions are executed by a processor, the processor performs the method in any one of the first aspect or the possible implementations of the first aspect.

A tenth aspect of this disclosure provides a computer program product storing one or more computer-executable instructions. When the computer-executable instructions are executed by a processor, the processor performs the method in any one of the second aspect or the possible implementations of the first aspect.

An eleventh aspect of this disclosure provides a chip system. The chip system includes at least one processor. The at least one processor is configured to implement the function in any one of the first aspect or the possible implementations of the first aspect. In a possible design, the chip system may further include a memory. The memory is configured to store program instructions and data that are necessary for an artificial intelligence model processing apparatus. The chip system may include a chip, or may include a chip and another discrete component.

A twelfth aspect of this disclosure provides a chip system. The chip system includes at least one processor. The at least one processor is configured to implement the function in any one of the second aspect or the possible implementations of the first aspect. In a possible design, the chip system may further include a memory. The memory is configured to store program instructions and data that are necessary for an artificial intelligence model processing apparatus. The chip system may include a chip, or may include a chip and another discrete component.

A thirteenth aspect of this disclosure provides a wireless communication system. The wireless communication system includes the wireless communication device in the third aspect and the wireless communication device in the fourth aspect.

According to the foregoing technical solutions, it can be learned that embodiments of this disclosure have the following advantages.

In embodiments of this disclosure, when a wireless communication device generates a to-be-sent signal, a target signal is generated based on a first signal obtained through frequency spreading. Therefore, the target signal has a wider information bandwidth, the target signal has a strong anti-interference capability, and a transmission distance of the target signal is greatly increased. In addition, because different spreading codes are used for different signals during frequency spreading, a wireless communication device that receives the target signal can distinguish between different signals based on the different spreading codes. This effectively improves efficiency of receiving different signals by the wireless communication device at the same time. In addition, the first device generates the first signal through channel encoding. This ensures information transmission reliability, reduces an information transmission error, and improves signal transmission quality.

DESCRIPTION OF EMBODIMENTS

Embodiments of this disclosure provide a signal generation method, a signal processing method, and a related device, to enhance an anti-interference capability and a coverage area of a target signal.

The following describes embodiments of this disclosure with reference to accompanying drawings. It is clear that the described embodiments are merely some but not all of embodiments of this disclosure. A person of ordinary skill in the art may learn that, with development of technologies and emergence of a new scenario, technical solutions provided in embodiments of this disclosure are also applicable to a similar technical problem.

In the specification, claims, and accompanying drawings of this disclosure, the terms "first", "second", and the like are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
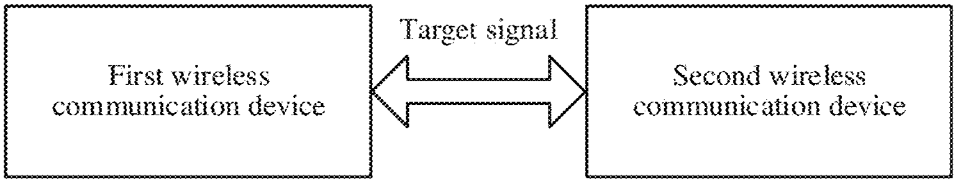
FIG. 1 is a network architecture diagram of a wireless communication system.
Figure 2:
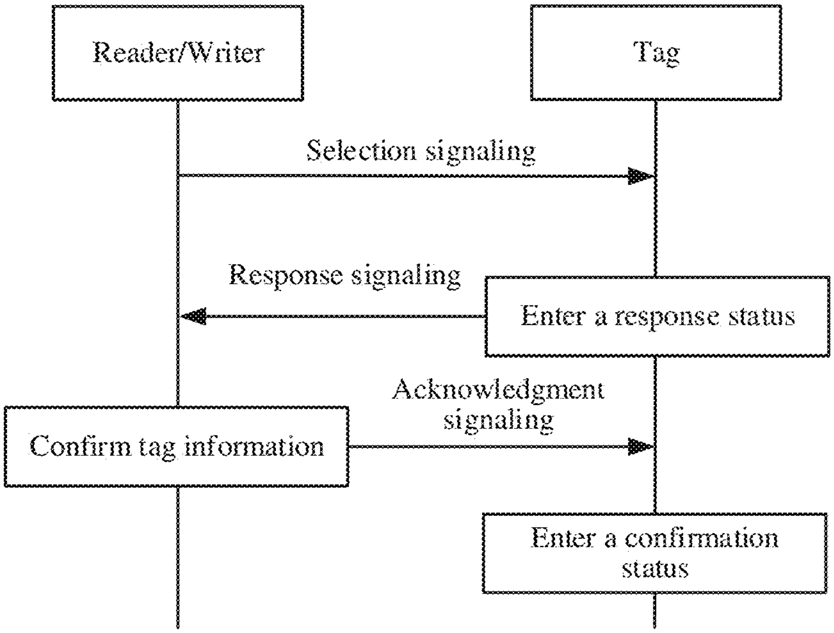
FIG. 2 is a schematic flowchart of a radio frequency identification communication system.

Refer to FIG. 1. In a current wireless communication system, when a first device needs to send some information to a second device, the first device needs to generate one piece of transmission information based on the information, then generates one target signal based on the transmission information, and sends the target signal to the second device. As shown in FIG. 2, when wireless communication is performed between a first device, namely, one tag, and one reader/writer, namely, a second device, over a radio link, the reader/writer first sends selection (select) signaling to the tag, and based on a radio frequency identification (RFID) communication system air interface protocol ISO 18000-6C, the tag that enters a response status sends a response signal to the reader/writer over a reflection link by using a dynamic slot technology. When generating the response signal, the tag usually first generates one piece of transmission information by performing encoding with a Miller code or an FM0 code on the information that is to be sent, and then modulates the transmission information into a response signal that can be sent, by using a binary phase shift keying (BPSK) or amplitude shift keying (ASK) information modulation technology. The first device and the second device may be access network devices or wireless communication devices such as a macro base station, a pole base station, a long term evolution (LTE) base station, an evolved base station (evolved NodeB, eNB), a wireless relay (Relay) station, a Femto base station, a Pico base station, and a next generation base station (next generation NodeB, gNB), or may be wireless terminals such as an LTE assisting terminal, an NR assisting terminal, an assistant, a semi-active tag, an active tag, a wireless relay station, an LTE mobile phone, and an NR mobile phone.

Figure 3:
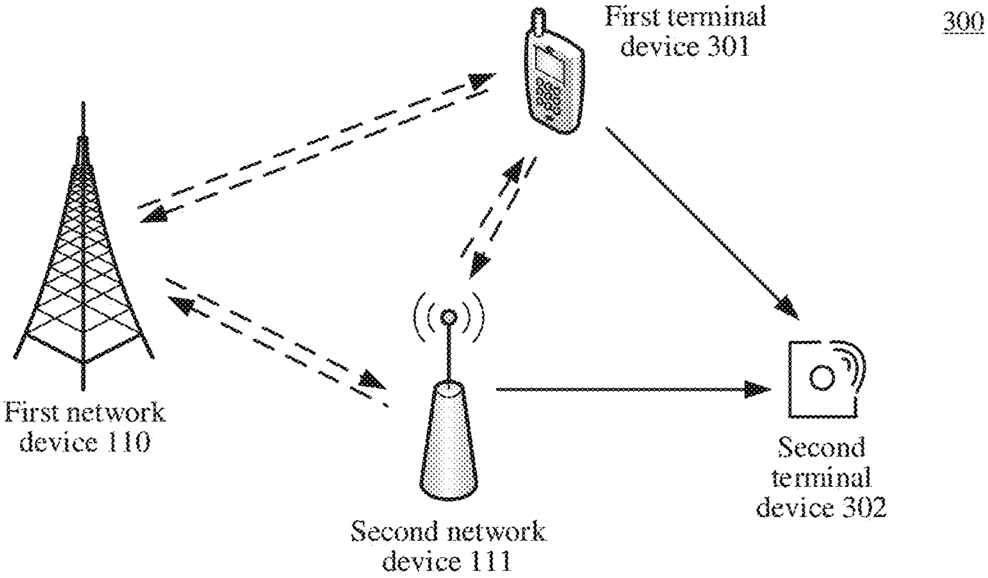
FIG. 3 is a schematic diagram of a network scenario of a wireless communication system.

Refer to FIG. 3. A wireless communication system 300 in an embodiment of this disclosure includes a first network device 110, a second network device 111, a first terminal device 301, and a second terminal device 302. The first network device 110 and the second network device 111 may send downlink data to the first terminal device 301 and the second terminal device 302. Certainly, the first terminal device 301 and the second terminal device 302 may further send uplink data to the first network device 110 and the second network device 111. The first terminal device 301 may be any other suitable terminal device configured to perform communication in the wireless communication system 300, for example, a handheld communication device or a communication device at a fixed location, and serves as an assisting terminal device for the terminal device 302 to identify and provide energy. The second terminal device 302 may be a semi-active tag and a passive tag in the wireless communication system 300. The wireless communication system 300 in this embodiment of this disclosure may include more or fewer network devices or terminal devices. The wireless communication system 300 may be a public land mobile network (PLMN), a device-to-device (D2D) network, a machine-to-machine (machine-to-machine, M2M) network, an internet of things (IoT) network, an LTE-Advanced Pro network, a further evolved network based on LTE or NR, or another network. This is not specifically limited herein.

Based on the foregoing wireless communication system, the following describes a signal generation method in embodiments of this disclosure.

An embodiment of this disclosure provides a signal generation method. Specifically, a target signal is generated through frequency spreading based on transmission information that needs to be sent, and the target signal is used for information transmission between wireless communication devices. The target signal is generated based on a first signal obtained through the frequency spreading. Therefore, the target signal has a wider information bandwidth, the target signal may have a strong anti-interference capability, and a transmission distance of the target signal is greatly increased. In addition, because different spreading codes are used for different signals during the frequency spreading, a wireless communication device that receives the target signal can distinguish between different signals based on the different spreading codes. This effectively improves efficiency of receiving different signals by the wireless communication device at the same time.

In embodiments of this disclosure, the first device and the second device may be access network devices such as a macro base station, a pole base station, a long term evolution (LTE) base station, an evolved base station (evolved NodeB, eNB), a wireless relay (Relay) station, a Femto base station, a Pico base station, and a next generation base station (next generation NodeB, gNB), or may be wireless devices such as an LTE assisting terminal, an NR assisting terminal, an assistant, a semi-active tag, an active tag, an energy storage tag, a wireless relay station, an LTE mobile phone, and an NR mobile phone.

In this embodiment of this disclosure, the first device may be an access network device, for example, a base station and a reader/writer, an assistant, or an assisting terminal, or may be a wireless device that can receive energy, for example, a passive tag, a semi-active tag, an active tag, or an energy storage tag. Descriptions are separately provided below.

1. The first device is a wireless device that can receive energy, for example, a passive tag, a semi-active tag, or an active tag.

Figure 4:
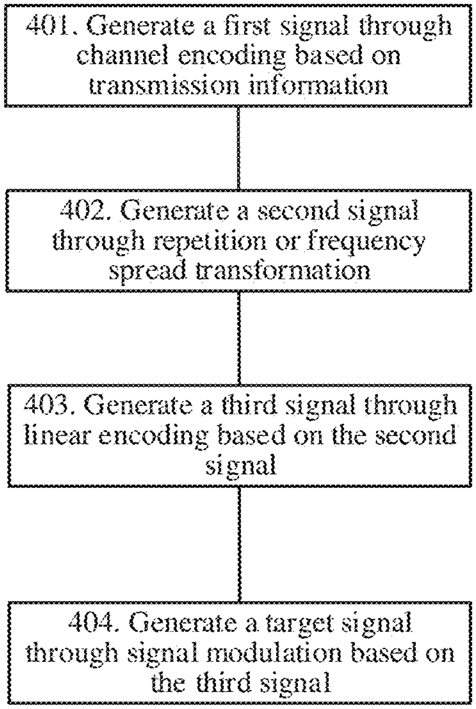
FIG. 4 is a schematic flowchart of a signal generation method according to an embodiment of this disclosure.

Refer to FIG. 4. A procedure of a signal generation method according to an embodiment of this disclosure includes the following steps.

401. The first device obtains, based on transmission information, a first signal through channel encoding.

Figure 5:
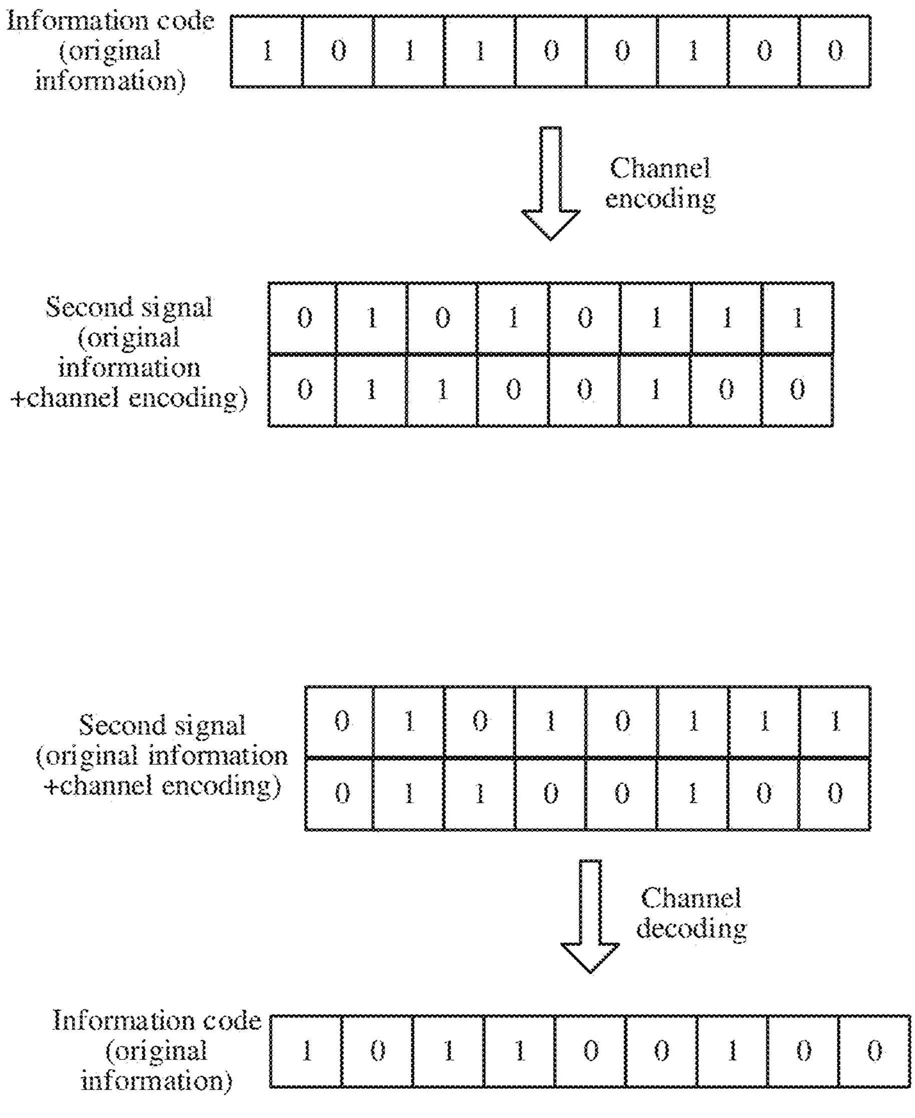
FIG. 5 is another schematic flowchart of a signal generation method according to an embodiment of this disclosure.

Refer to FIG. 5. The first device obtains the transmission information through channel encoding for information that needs to be sent. Specifically, when the first device needs to send some information to a second device, the first device generates one piece of transmission information based on the information. The transmission information includes the information that needs to be sent. Then, the first device generates first information through channel encoding for the transmission information that is generated by encoding the information that needs to be sent. The first information may alternatively be transmission information in a form of a bit stream.

The first signal obtained through performing channel encoding on the transmission information may be a first signal generated online, or may be a first signal prestored by the first device. For example, when sending some random information, the first device may use the first signal generated online, and when sending some fixed information, the first device may use the first signal prestored offline by the first device. In addition, the first device may alternatively perform channel encoding transformation in a manner of combining a first signal that is prestored offline and a first signal that is generated online. For example, a part of the sent information is prestored offline, and the other part of the information is generated online, for example, when storage space of a memory of the first device is limited. This is not specifically limited herein.

During the channel encoding in this embodiment of this disclosure, encoding check, that is, error detection, may be first performed on the transmission information that needs to be sent, and then channel encoding transformation is performed. A used encoding check method may be a cyclic redundancy check, a checksum method, a parity check method, or another check method. This is not specifically limited herein.

In this embodiment of this disclosure, channel encoding used for channel encoding transformation may be Polar code or low density parity check code (LDPC) encoding. This is not specifically limited herein.

Correspondingly, after receiving the target signal sent by the first device, a network device, for example, the second device, may perform error correction based on the channel encoding, to determine whether the received target information has an error and a location of the error.

In this embodiment of this disclosure, the first device generates the first signal through channel encoding transformation for the information that needs to be sent. Redundant information used for the error correction is added during the channel encoding transformation. Therefore, after receiving the target signal, the second device that receives the target signal may determine, based on the redundant information in the channel encoding, whether the received target information has an error and a location of the error, and may perform error correction, to ensure information transmission reliability and improve signal transmission quality.

402. The first device generates a second signal through repetition or frequency spread transformation.

Figure 6A:
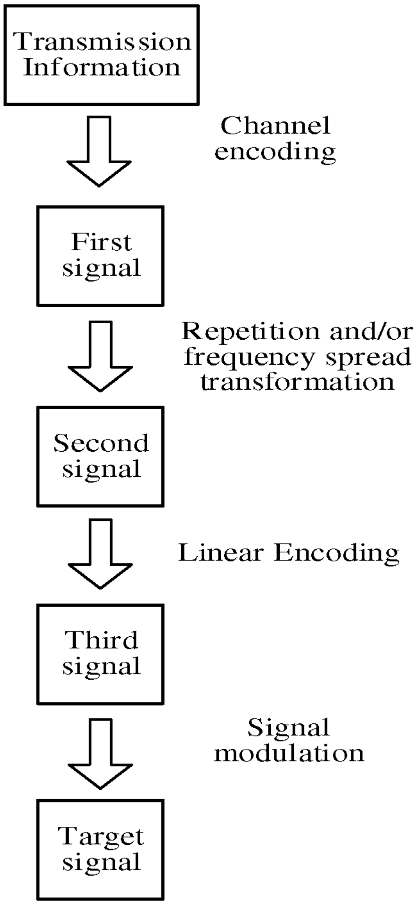
FIG. 6A to FIG. 6C are another schematic flowchart of a signal generation method according to an embodiment of this disclosure.

Refer to FIG. 6A. The first device generates the second signal based on the first signal through the repetition or the frequency spread transformation. Specifically, the first device may alternatively generate the second signal through the repetition. Specifically, the first device may first generate a plurality of corresponding information bits based on at least one information bit in the first signal and a determined quantity of repetition times, and does not perform frequency spreading. The plurality of information bits are the generated second signal.

In a possible implementation, the first device may first generate a plurality of corresponding same information bits based on the at least one information bit in the first signal and the determined quantity of repetition times. Then, the first device determines a first orthogonal spreading code based on a spreading factor. The first device then multiplies the plurality of information bits by each element in a corresponding sequence of the first orthogonal spreading code, to obtain a plurality of information bits generated by frequency spreading. The plurality of information bits generated by frequency spreading are the generated second signal.

In a possible implementation, the first device determines a code sequence of the first orthogonal spreading code based on determined linear encoding and an expansion factor of the linear encoding, where the code sequence of the first orthogonal spreading code may be determined based on a principle that a signal phase changes most or a rising/falling edge appears most in a signal after the determined linear encoding and the first orthogonal spreading code are combined, and then the second signal is generated through frequency spread transformation. It may be understood that in this possible implementation, a manner in which the first device first performs linear encoding and expansion factor expansion encoding on the first signal may be understood as a part of the repetition or frequency spread transformation manner. Correspondingly, if the manner of the linear encoding and the expansion factor expansion encoding is performed first, instead of the linear encoding, signal modulation is performed after step 402. In other words, in this embodiment of this disclosure, both the repetition or frequency spread transformation and the linear encoding that are performed by the first device are signal encoding manners, and the two manners may be implemented by combination in any sequence. To be specific, the repetition or frequency spread transformation may be performed first, and then the linear encoding is performed. Alternatively, the linear encoding may be performed first, and then repetition or frequency spread transformation is performed. This is not limited in this embodiment of this disclosure.

Specifically, in this possible implementation, the first device first performs linear encoding on the first signal, and then the first device determines the code sequence of the first orthogonal spreading code based on a linear code used for the linear encoding. For example, the linear code that the first device uses based on the linear encoding may be an FM0 or Miller code, where the FM0 or Miller encoding is an encoding manner in which an expansion factor is 1, 2, 4, or 8. Then, the first device may determine, based on a linear encoding type and a corresponding encoding expansion factor, one or more spreading code sequences corresponding to the linear encoding. Then, the first device generates the second signal based on the spreading code sequence through repetition or frequency spread transformation.

In this possible implementation, the linear code used by the first device to perform linear encoding includes an FM0 code, a Miller code, a Manchester code, or the like. This is not specifically limited herein.

In this embodiment of this disclosure, the determined quantity of repetition times in the foregoing overview of the frequency spread transformation may be preset in advance, or may be generated and determined online, or may be sent by an access network device, for example, a base station or a reader/writer, that is, the second device, to the first device in advance. This is not specifically limited herein.

In this embodiment of this disclosure, the first orthogonal spreading code used for the foregoing frequency spread transformation may be an orthogonal spreading code, for example, a complementary Gray code, a Walsh code, or a Huffman code. This is not specifically limited herein.

403. The first device generates a third signal based on the second signal through linear encoding.

The first device generates the third signal in a linear encoding manner based on the second signal. Specifically, in this embodiment of this disclosure, the second signal is a plurality of information bits obtained through repetition or frequency spread transformation. The first device may generate the third signal in the linear encoding manner based on the plurality of information bits in the second signal and a determined linear code. The linear code used by the first device based on the linear encoding may be an FM0 or Miller code, and FM0 or Miller encoding may be an encoding manner in which a spreading factor is 2, 4, or 8.

In this embodiment of this disclosure, the linear code used for the linear encoding includes an FM0 code, a Miller code, a Manchester code, or the like. This is not specifically limited herein.

In a possible implementation, the first device may alternatively generate, based on the second signal, one corresponding high autocorrelation performance sequence code, and the sequence code is the third signal. In this possible implementation, the sequence code may be a corresponding high autocorrelation performance sequence code, for example, a ZC sequence, a Gold sequence, or a Barker sequence. This is not specifically limited herein.

In this embodiment of this disclosure, the first device first performs repetition or frequency spread transformation, and then performs linear encoding to generate one third signal in a form of a bit stream. In addition, the first device may first perform linear encoding on the first signal, and then generate the second signal through repetition or frequency spread transformation. In other words, in this embodiment of this disclosure, both the repetition or frequency spread transformation and the linear encoding that are performed by the first device are signal encoding manners. The two may be implemented by combination in any sequence. To be specific, the repetition or frequency spread transformation may be performed first, and then the linear encoding is performed. Alternatively, the linear encoding may be performed first, and then repetition or frequency spread transformation is performed. In other words, in this embodiment of this disclosure, step 403 may be first performed, and then step 402 is performed. This is not specifically limited herein.

In this embodiment of this disclosure, if the first device first performs step 403 and then performs step 402, in a possible implementation, the first device first performs linear encoding on the first signal, and the first device determines a corresponding spreading factor based on a linear code used for the linear encoding, and then determines a sequence of a first orthogonal spreading code based on the spreading factor. For example, the linear code that the first device uses based on the linear encoding may be an FM0 or Miller code, and FM0 or Miller encoding may be an encoding manner in which a spreading factor is 1, 2, 4, or 8. Then, the first device may determine, based on a linear encoding type and an encoding expansion factor, one or more spreading code sequences corresponding to the linear encoding. Then, the first device generates the second signal based on the spreading code sequence through repetition or frequency spread transformation.

404. The first device generates the target signal based on the third signal through signal modulation.

Figure 6B:
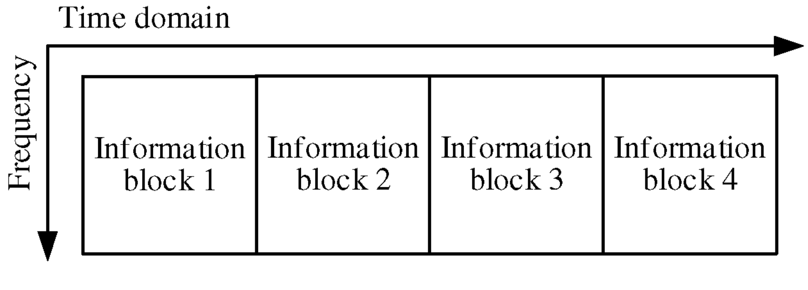

As shown in FIG. 6B, the first device generates the target signal based on the third signal, and the target signal carries the information that the first device needs to send to the second device. Specifically, the first device may perform signal modulation on a plurality of bits in the third signal to generate the target signal, to map the plurality of information blocks on which the signal modulation is performed to corresponding time domain and frequency domain resources. The target signal may be sent to the second device, to perform information transmission with the second device.

In a possible implementation, the first device generates a fourth signal through signal modulation for a plurality of bits in the third signal, and then generates the target signal through repetition or frequency spreading for a plurality of information blocks on which the signal modulation is performed, namely, the fourth signal. Specifically, the first device generates the fourth signal through signal modulation for the plurality of bits in the third signal, and then performs, based on a determined quantity of times, repetition on the plurality of information blocks on which the signal modulation is performed, namely, the fourth signal, to obtain the target signal in a form of a plurality of information blocks.

Figure 6C:
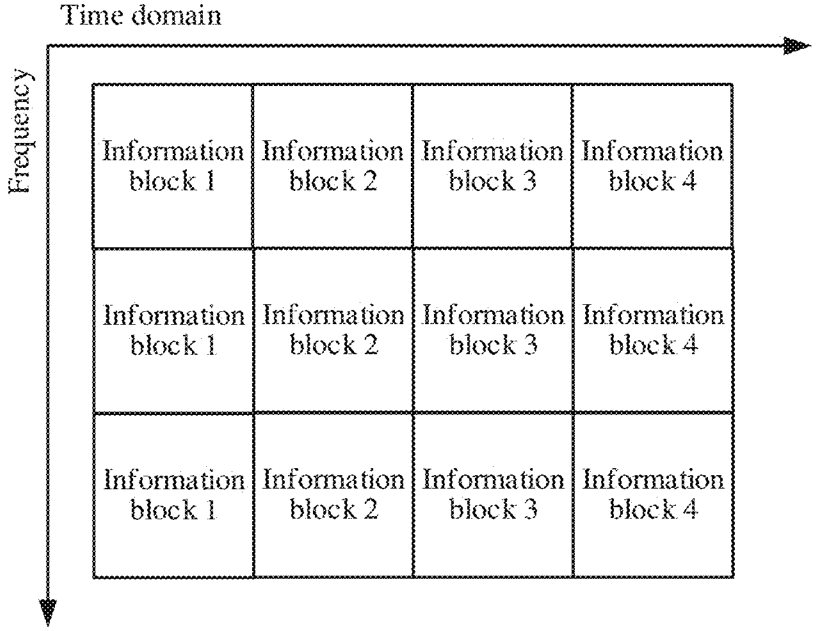

As shown in FIG. 6C, in a possible implementation, the first device may alternatively generate the fourth signal through signal modulation for a plurality of bits in the third signal, and then performs repetition on a plurality of information blocks on which the signal modulation is performed, namely, the fourth signal, based on a determined quantity of times. A plurality of information blocks on which the repetition is performed are the target signal that is to be sent to the second device.

In a possible implementation, the first device may alternatively generate the fourth signal through signal modulation for a plurality of bits in the third signal, then perform, based on a determined quantity of times, repetition on a plurality of information blocks on which the signal modulation is performed, namely, the fourth signal, and then multiply a plurality of information blocks on which the repetition is performed by a second orthogonal spreading code, to obtain the target signal in a form of a plurality of information blocks. The first device may determine, based on a linear encoding type and an encoding expansion factor, one or more second spreading code sequences corresponding to the linear encoding type and the encoding expansion factor. The one or more second spreading code sequences may alternatively be determined in another manner. This is not specifically limited herein.

In this embodiment of this disclosure, a modulation manner used for signal modulation may be BPSK or ASK. This is not specifically limited herein.

In this embodiment of this disclosure, if repetition or frequency spread transformation is performed in step 402, the repetition or frequency spread transformation may be performed in step 404, or the repetition or frequency spread transformation may not be performed. This is not specifically limited herein.

In this embodiment of this disclosure, a value of a quantity of repetition times may be preset, or may be determined by the second device through receiving an indication from the first device. This is not specifically limited herein.

In this embodiment of this disclosure, the orthogonal spreading code used for the foregoing frequency spread transformation may be an orthogonal spreading code, for example, a complementary Gray code, a Walsh code, or a Huffman code. This is not specifically limited herein.

In this embodiment of this disclosure, the first orthogonal spreading code used by the first device to generate the target signal based on the third signal may be the same as or different from the second orthogonal spreading code used by the first device to generate the second signal through frequency spread transformation. This is not specifically limited herein.

Figure 7:
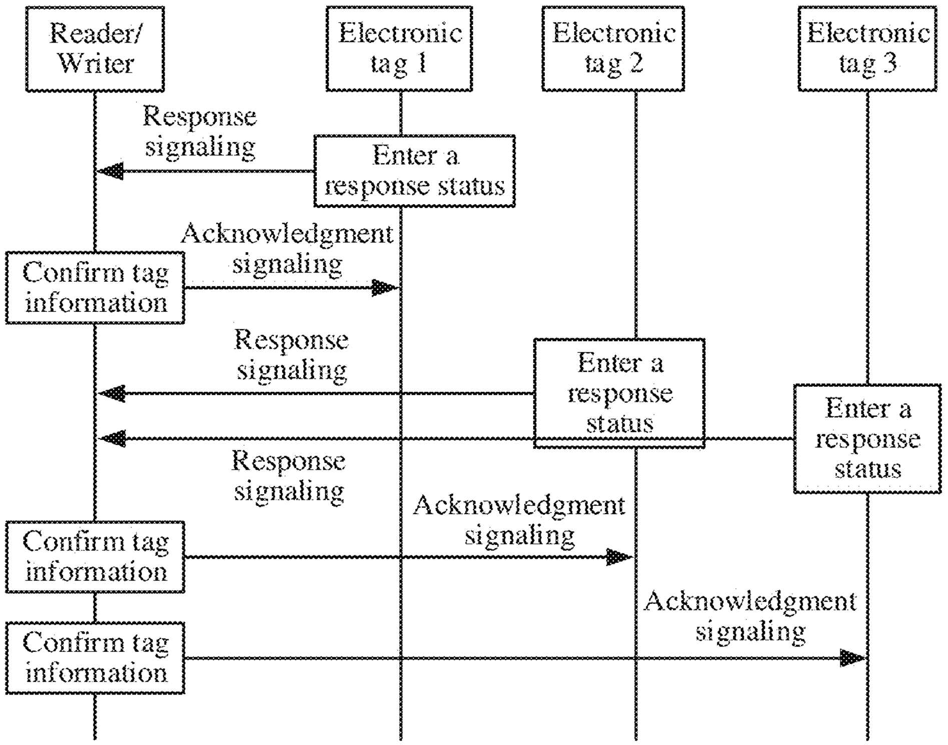
FIG. 7 is another schematic flowchart of a signal generation method according to an embodiment of this disclosure.

In this embodiment of this disclosure, the first device generates the first signal through frequency spread transformation. Therefore, in one aspect, the target signal has a wider spectrum and a wider transmission bandwidth, that is, an information bandwidth. Therefore, the target signal has a stronger anti-interference capability, and a transmission distance of the target signal is greatly increased. As shown in FIG. 7, in another aspect, because different first devices use different first spreading codes when performing frequency spread transformation, a wireless communication device that receives the target signal, that is, the second device, may distinguish between different signals accordingly. As shown in FIG. 7, a reader/writer may simultaneously receive and distinguish between response signals sent by an electronic tag 2 and an electronic tag 3. This effectively improves efficiency of receiving different signals by the wireless communication device at the same time, enables the target signal to have good confidentiality, and improves a confidential communication capability of the target signal.

In this embodiment, the second device may be an access network device, for example, a macro base station, a pole base station, a long term evolution (LTE) base station, an evolved base station (evolved NodeB, eNB), a wireless relay (Relay) station, a Femto base station, a Pico base station, and a next generation base station (next generation NodeB, gNB). The first device may be a wireless terminal, for example, an LTE assisting terminal, an NR assisting terminal, an assistant, a semi-active tag, an active tag, a wireless relay station, an LTE mobile phone, and an NR mobile phone. This is not specifically limited herein.

In this embodiment of this disclosure, when generating a signal that is to be sent, a wireless communication device generates a second signal through frequency spreading for transmission information that needs to be sent, and then generates a target signal based on the second signal. The target signal is used for information transmission between wireless communication devices. The target signal is generated based on a first signal obtained through the frequency spreading. Therefore, the target signal has a wider information bandwidth, the target signal has a strong anti-interference capability, and a transmission distance of the target signal is greatly increased. In addition, because different spreading codes are used for different signals during frequency spreading, a wireless communication device that receives the target signal can distinguish between different signals based on the different spreading codes. This effectively improves efficiency of receiving different signals by the wireless communication device at the same time. In addition, channel encoding is used when the first device generates the first signal, to ensure information transmission reliability, reduce an information transmission error, and improve signal transmission quality.

In this embodiment of this disclosure, the first device is a wireless device that can receive energy, for example, a passive tag, a semi-active tag, or an active tag. In addition, the first device may alternatively be an access network device, for example, a base station, a reader/writer, an assistant, or an assisting terminal. Details are described below.

2. A first device is an access network device, for example, a base station, a reader/writer, an assistant, or an assisting terminal.

Figure 8:
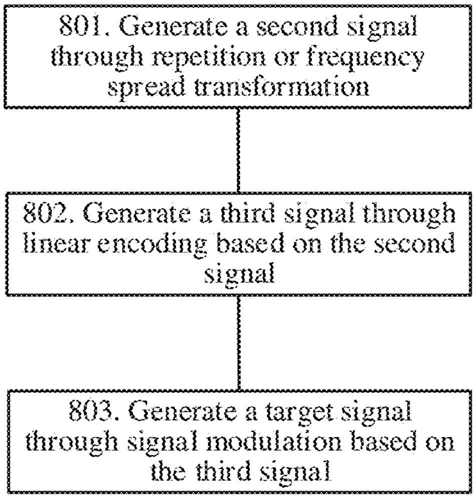
FIG. 8 is another schematic flowchart of a signal generation method according to an embodiment of this disclosure.

Refer to FIG. 8. A procedure of a signal generation method according to an embodiment of this disclosure includes the following steps.

801. The first device generates a second signal through repetition or frequency spread transformation.

The first device generates the second signal through the repetition or the frequency spread transformation based on transmission information. Specifically, when the first device needs to send some information to a second device, for example, when the first device needs to send some information to the second device, the first device generates one piece of transmission information based on the information. The transmission information includes the information that needs to be sent, and then the first device generates the second signal through the repetition. Specifically, the first device may first generate a plurality of corresponding information bits based on at least one information bit in the transmission information and a determined quantity of repetition times, and does not perform frequency spreading. The plurality of information bits are the generated second signal.

In a possible implementation, the first device may alternatively first generate a plurality of corresponding same information bits based on a plurality of information bits in the transmission information and a determined quantity of repetition times. The first device then multiplies the plurality of information bits by each element in a corresponding sequence of a first orthogonal spreading code, to obtain a plurality of information bits generated by frequency spreading. The plurality of information bits generated by frequency spreading are the generated second signal.

In a possible implementation, the first device determines a code sequence of the first orthogonal spreading code based on determined linear encoding, where the code sequence of the first orthogonal spreading code may be determined based on a principle that a signal phase changes most or a rising/falling edge appears most in a signal after the determined linear encoding and the first orthogonal spreading code are combined, and then the second signal is generated through frequency spread transformation. It may be understood that in this possible implementation, a manner in which the first device first performs linear encoding on the first signal may be understood as a part of the repetition or frequency spread transformation manner. Correspondingly, if the linear encoding is performed first, instead of the linear encoding, signal modulation is performed after step 801. In other words, in this embodiment of this disclosure, both the repetition or frequency spread transformation and the linear encoding that are performed by the first device are signal encoding manners, and the two manners may be implemented by combination in any sequence. To be specific, the repetition or frequency spread transformation may be performed first, and then the linear encoding is performed. Alternatively, the linear encoding may be performed first, and then repetition or frequency spread transformation is performed. This is not limited in this embodiment of this disclosure.

Specifically, in this possible implementation, the first device first performs linear encoding on the first signal, and then the first device determines the code sequence of the first orthogonal spreading code based on a linear code used for the linear encoding. For example, the linear code that the first device uses based on the linear encoding may be a PIE code. Then, the first device may determine, based on a linear encoding type, one or more spreading code sequences corresponding to the linear encoding, and then the first device generates the second signal based on the spreading code sequence through repetition or frequency spread transformation.

In this possible implementation, the linear code used by the first device to perform linear encoding includes a PIE linear code and another code whose encoded bit is 1 or that uses another linear encoding manner in which a high level appears for a large quantity of times. This is not specifically limited herein.

In this embodiment of this disclosure, the determined quantity of repetition times in the frequency spread transformation may be preset in advance, or may be generated and determined online, or may be sent to the first device in advance by a wireless device that can receive energy, that is, the second device, for example a passive tag, a semi-active tag, or an active tag. This is not specifically limited herein.

In this embodiment of this disclosure, the first orthogonal spreading code used for the foregoing frequency spread transformation may be an orthogonal spreading code, for example, a complementary Gray code or a Walsh code. This is not specifically limited herein.

In this embodiment of this disclosure, the first device generates the second signal through the frequency spread transformation. Therefore, in one aspect, a target signal has a wider spectrum and a wider transmission bandwidth, that is, an information bandwidth. Therefore, the target signal has a stronger anti-interference capability, and a transmission distance of the target signal is greatly increased. As shown in FIG. 7, in another aspect, because different first devices use different first spreading codes when performing frequency spread transformation, a wireless communication device that receives the target signal, that is, the second device, may distinguish between different signals accordingly. As shown in FIG. 7, the reader/writer may simultaneously receive and distinguish between response signals sent by the electronic tag 2 and the electronic tag 3. This effectively improves efficiency of receiving different signals by the wireless communication device at the same time, enables the target signal to have good confidentiality, and improves a confidential communication capability of the target signal.

802. The first device generates a third signal based on the second signal through linear encoding.

The first device generates the third signal in a linear encoding manner based on the second signal. Specifically, in this embodiment of this disclosure, the second signal is a plurality of information bits obtained through repetition or frequency spread transformation. The first device may generate the third signal in a linear encoding manner based on the plurality of information bits in the second signal and a determined linear code.

In this possible embodiment of this disclosure, the linear code used for the linear encoding includes a PIE linear code or another code whose encoded bit is 1 or that uses another linear encoding manner in which a high level appears for a large quantity of times. This is not specifically limited herein.

In a possible implementation, the first device may alternatively generate, based on the second signal, one corresponding high autocorrelation performance sequence code, and the sequence code is the third signal. In this possible implementation, the sequence code may be a corresponding high autocorrelation performance sequence code, for example, a ZC sequence, a Gold sequence, or a Barker sequence. This is not specifically limited herein.

In this embodiment of this disclosure, the first device first performs repetition or frequency spread transformation, and then performs linear encoding to generate one third signal in a form of a bit stream. In addition, the first device may first perform linear encoding on the first signal, and then generate the second signal through repetition or frequency spread transformation. In other words, in this embodiment of this disclosure, both the repetition or frequency spread transformation and the linear encoding that are performed by the first device are signal encoding manners. The two may be implemented by combination in any sequence. To be specific, the repetition or frequency spread transformation may be performed first, and then the linear encoding is performed. Alternatively, the linear encoding may be performed first, and then repetition or frequency spread transformation is performed. In other words, in this embodiment of this disclosure, step 802 may be first performed, and then step 801 is performed. This is not specifically limited herein.

In this embodiment of this disclosure, if the first device first performs step 802 and then performs step 801, in a possible implementation, the first device first performs linear encoding on the first signal, and then the first device determines the first orthogonal spreading code based on the linear encoding. For example, the linear code used by the first device based on the linear encoding may be a PIE linear code or another code whose encoded bit is 1 or that uses another linear encoding manner in which a high level appears for a large quantity of times. Then, the first device may determine, based on a linear encoding type, one or more spreading code sequences corresponding to the linear encoding, and then the first device generates the second signal based on the spreading code sequence through repetition or frequency spread transformation.

803. The first device generates a target signal based on the third signal through signal modulation.

The first device generates the target signal based on the third signal, and the target signal carries information that the first device needs to send to the second device. Specifically, the first device may perform signal modulation on a plurality of bits in the third signal to generate the target signal, to map the plurality of information blocks on which the signal modulation is performed to corresponding time domain and frequency domain resources. The target signal may be sent to the second device, to perform information transmission with the second device.

In a possible implementation, the first device generates a fourth signal through signal modulation for a plurality of bits in the third signal, and then generates the target signal through repetition or frequency spreading for a plurality of information blocks on which the signal modulation is performed, namely, the fourth signal. Specifically, the first device generates the fourth signal through signal modulation for the plurality of bits in the third signal, and then performs, based on a determined quantity of times, repetition on the plurality of information blocks on which the signal modulation is performed, namely, the fourth signal, to obtain the target signal in a form of a plurality of information blocks.

In a possible implementation, the first device may alternatively generate the fourth signal through signal modulation for a plurality of bits in the third signal, then perform, based on a determined quantity of times, repetition on a plurality of information blocks on which the signal modulation is performed, namely, the fourth signal, and then multiply a plurality of information blocks on which the repetition is performed by a second orthogonal spreading code, to obtain the target signal in a form of a plurality of information blocks. The first device may determine, based on a linear encoding type, one or more second spreading code sequences corresponding to the linear encoding. The one or more second spreading code sequences may alternatively be determined in another manner. This is not specifically limited herein.

In this embodiment of this disclosure, a modulation manner used for the signal modulation may be an ASK manner or an OOK manner. This is not specifically limited herein.

In this embodiment of this disclosure, if repetition or frequency spread transformation is performed in step 801, the repetition or frequency spread transformation may be performed in step 803, or the repetition or frequency spread transformation may not be performed. This is not specifically limited herein.

In this embodiment of this disclosure, the orthogonal spreading code used for the foregoing frequency spread transformation may be an orthogonal spreading code, for example, a complementary Gray code or a Walsh code. This is not specifically limited herein.

In this embodiment of this disclosure, the first orthogonal spreading code used by the first device to generate the target signal based on the third signal may be the same as or different from the second orthogonal spreading code used by the first device to generate the second signal through frequency spread transformation. This is not specifically limited herein.

In this embodiment, the first device may be an access network device, for example, a macro base station, a pole base station, a long term evolution (LTE) base station, an evolved base station (evolved NodeB, eNB), a wireless relay (Relay) station, a Femto base station, a Pico base station, and a next generation base station (next generation NodeB, gNB). The second device may be a wireless terminal, for example, an LTE assisting terminal, an NR assisting terminal, an assistant, a semi-active tag, an active tag, a wireless relay station, an LTE mobile phone, and an NR mobile phone. This is not specifically limited herein.

In this embodiment of this disclosure, when generating a signal that is to be sent, a wireless communication device generates a second signal through frequency spreading for transmission information that needs to be sent, and then generates a target signal based on the second signal. The target signal is used for information transmission between wireless communication devices. The target signal is generated based on a first signal obtained through the frequency spreading. Therefore, the target signal has a wider information bandwidth, the target signal has a strong anti-interference capability, and a transmission distance of the target signal is greatly increased. In addition, because different spreading codes are used for different signals during frequency spreading, a wireless communication device that receives the target signal can distinguish between different signals based on the different spreading codes. This effectively improves efficiency of receiving different signals by the wireless communication device at the same time. In addition, channel encoding is used when the first device generates a first signal, to ensure information transmission reliability, reduce an information transmission error, and improve signal transmission quality.

Based on the foregoing wireless communication system, the following describes a signal processing method in embodiments of this disclosure.

Figure 9:
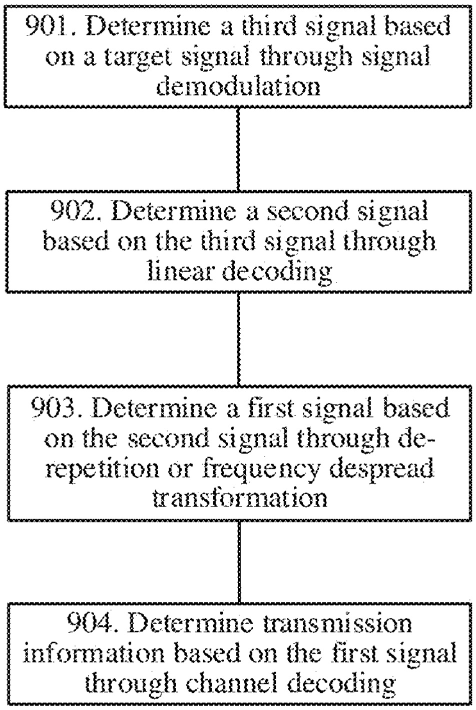
FIG. 9 is a schematic flowchart of a signal processing method according to an embodiment of this disclosure.

Refer to FIG. 9. A procedure of a signal processing method according to an embodiment of this disclosure includes the following steps.

901. A second device determines a third signal based on a target signal through signal demodulation.

The second device determines the third signal based on the target signal that is sent by a first electronic device and on which signal modulation is performed, where the target signal carries information that needs to be sent by the first device to the second device. Specifically, the second device obtains a fourth signal through signal demodulation for the target signal, that is, an inverse operation of step 404 shown in FIG. 4. Alternatively, the target signal may be in a form of a plurality of information blocks. The target signal is a signal that is sent by the first electronic device to the second device, and is used for information transmission with the second device.

In a possible implementation, the second device may first determine, based on the target signal through frequency despread transformation, a plurality of signal blocks on which repetition is performed, and then determine the fourth signal based on the repeated signal blocks through de-repetition, where the fourth signal is in a form of a plurality of information blocks on which signal modulation is performed. Then, the second device determines the third signal through signal demodulation based on the fourth signal. In addition, the second device may alternatively determine the fourth signal based on the target signal through de-repetition. The fourth signal is in a form of a plurality of information blocks on which signal modulation is performed, and then the second device determines the third signal through signal demodulation based on the fourth signal. Step 901 is an inverse operation corresponding to step 404, and an operation of step 901 may be determined in reverse deduction based on the operation of step 404.

In this embodiment of this disclosure, a quantity of repetition times in the foregoing overview of the frequency spread transformation may be preset in advance, or may be generated and determined online. This is not specifically limited herein.

In this embodiment of this disclosure, an orthogonal spreading code used for the foregoing frequency spread transformation and frequency despread transformation may be an orthogonal spreading code, for example, a complementary Gray code, a Walsh code, or a Huffman code. This is not specifically limited herein.

In this embodiment of this disclosure, a demodulation manner used for the signal demodulation may be a demodulation manner corresponding to BPSK or ASK. This is not specifically limited herein.

902. The second device determines, based on the third signal, a second signal through linear decoding.

The second device determines, based on the third signal, the second signal in a linear decoding manner. Specifically, in this embodiment of this disclosure, the third signal is a signal obtained through linear encoding, and the third signal may be in a form of a plurality of information bits. Correspondingly, the second device performs linear decoding on the third signal by using a demodulation code corresponding to the third signal, to obtain the second signal.

Specifically, as shown in step 403 in FIG. 4, the first device may perform linear code encoding on a plurality of information bits in the first signal to generate a plurality of information bits on which the linear code encoding is performed. Correspondingly, in this embodiment of this disclosure, step 902 in which the second device obtains the second signal based on the third signal is an inverse operation of step 403, and an operation of step 902 may be determined in reverse deduction based on the operation of step 403. Specifically, the second signal is determined based on the third signal in a linear decoding manner.

In a possible implementation, the third signal is one corresponding high autocorrelation performance sequence code, and the second device may alternatively determine the second signal based on the third signal. In this possible implementation, the sequence code may be a corresponding high autocorrelation performance sequence code, for example, a ZC sequence, a Gold sequence, or a Barker sequence. This is not specifically limited herein.

In this embodiment of this disclosure, the first device may first perform linear encoding on the first signal, and then generate the second signal through repetition or frequency spread transformation. Correspondingly, the second device may first perform de-repetition or frequency despread transformation on the second signal, and then perform linear decoding to obtain the first signal. That is, step 903 is performed first, and then step 902 is performed.

In this embodiment of this disclosure, a demodulation code used for first linear code demodulation includes a corresponding demodulation code, for example, an FM0 code, a Miller code, a Manchester code, or the like. This is not specifically limited herein.

903. The second device determines the first signal based on the second signal.

The second device determines the first signal based on the second signal through de-repetition or frequency despread transformation. Specifically, the second device determines, through de-repetition or frequency despread transformation for the second signal, a plurality of corresponding information bits on which repetition is performed for a preset quantity of times, and then determines the first signal based on the plurality of corresponding information bits on which repetition is performed for a preset quantity of times. The first signal is a plurality of information bits on which repetition is not performed.

In this embodiment of this disclosure, when the first device performs repetition or frequency spread transformation, specifically, the first device may first generate a plurality of corresponding same information bits based on at least one information bit in the first signal and the determined quantity of repetition times, and then the first device multiplies the plurality of information bits by each element in a corresponding sequence of a first orthogonal spreading code, to obtain a plurality of information bits generated by spreading, where the plurality of information bits generated by spreading are the generated second signal. Correspondingly, the second device determines, through frequency despread transformation for the second signal, a plurality of corresponding information bits on which repetition is performed for a determined quantity of times, and then determines the first signal based on the plurality of corresponding information bits on which repetition is performed for a determined quantity of times. Alternatively, the first device may not multiply the first orthogonal spreading code, and repeat only each bit in the first signal based on the determined quantity of times. Correspondingly, the second device may alternatively determine the first signal through de-repetition for the second signal. This is not specifically limited herein. In this embodiment of this disclosure, step 903 shown in FIG. 9 is an inverse operation of step 402 shown in FIG. 4, and an operation of step 903 may be determined in reverse deduction based on the operation of step 402.

In this embodiment of this disclosure, the first orthogonal spreading code used for the foregoing frequency spread transformation and frequency despread transformation may be an orthogonal spreading code and a corresponding despreading code, for example, a complementary Gray code, a Walsh code, or a Huffman code. This is not specifically limited herein.

904. The second device determines transmission information based on the first signal.

The second device determines, based on the first signal, the transmission information through channel decoding, where the transmission information includes information that the first device needs to send to the second device.

Step 401 is that the first device generates the first signal by performing channel encoding transformation on the transmission information that needs to be sent. Correspondingly, step 904 is an inverse operation of step 401, and an operation of step 904 may be determined in reverse deduction based on the operation of step 401, in other words, the transmission information is determined based on the first signal.

During channel encoding in this embodiment of this disclosure, encoding check, that is, error detection, may be first performed on the transmission information that is generated by encoding the information that needs to be sent. Correspondingly, after receiving the target signal, the second device performs channel encoding transformation. A used encoding check method may be a check method, for example, a cyclic redundancy check, a checksum method, or a parity check method. This is not specifically limited herein.

In this embodiment of this disclosure, channel encoding and channel decoding that are used for performing channel encoding transformation and channel decoding may be Polar code and LDPC encoding. This is not specifically limited herein.

Correspondingly, after receiving the target signal sent by the first device, an access network device, for example, the second device, may perform error correction based on the channel encoding, to determine whether the received target information has an error and a location of the error.

In this embodiment, the second device may be an access network device, for example, a macro base station, a pole base station, a long term evolution (LTE) base station, an evolved base station (evolved NodeB, eNB), a wireless relay (Relay) station, a Femto base station, a Pico base station, and a next generation base station (next generation NodeB, gNB). The first device may be a wireless terminal, for example, an LTE assisting terminal, an NR assisting terminal, an assistant, a semi-active tag, an active tag, a wireless relay station, an LTE mobile phone, and an NR mobile phone. This is not specifically limited herein.

In this embodiment of this disclosure, the first device generates the second signal through channel encoding transformation for the information that needs to be sent. Redundant information used for the error correction is added during the channel encoding transformation. Therefore, after receiving the target signal, the second device that receives the target signal may determine, based on the redundant information in the channel encoding, whether the received target information has an error and a location of the error, and may perform error correction, to ensure information transmission reliability and improve signal transmission quality.

In this embodiment of this disclosure, when generating a signal that is to be sent, a wireless communication device generates a first signal through frequency spreading for transmission information that needs to be sent, and then generates a target signal based on the first signal. The target signal is used for information transmission between wireless communication devices. The target signal is generated based on the first signal obtained through the frequency spreading. Therefore, the target signal has a wider information bandwidth, the target signal has a strong anti-interference capability, and a transmission distance of the target signal is greatly increased. In addition, because different spreading codes are used for different signals during frequency spreading, a wireless communication device that receives the target signal can distinguish between different signals based on the different spreading codes. This effectively improves efficiency of receiving different signals by the wireless communication device at the same time.

Figure 10:
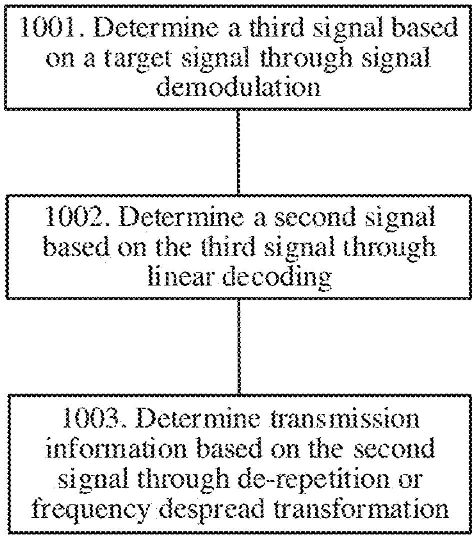
FIG. 10 is another schematic flowchart of a signal processing method according to an embodiment of this disclosure.

Refer to FIG. 10. A procedure of a signal processing method according to an embodiment of this disclosure includes the following steps.

1001. A second device determines a third signal based on a target signal through signal demodulation.

The second device determines the third signal based on the target signal that is sent by a first electronic device and on which signal modulation is performed, where the target signal carries information that needs to be sent by the first device to the second device. Specifically, the second device obtains a fourth signal through signal demodulation for the target signal, that is, an inverse operation of step 803 shown in FIG. 8. Alternatively, the target signal may be in a form of a plurality of information blocks. The target signal is a signal that is sent by the first electronic device to the second device, and is used for information transmission with the second device.

In a possible implementation, the second device may first determine, based on the target signal through frequency despread transformation, a plurality of signal blocks on which repetition is performed, and then determine the fourth signal based on the repeated signal blocks through de-repetition, where the fourth signal is in a form of a plurality of information blocks on which signal modulation is performed. Then, the second device determines the third signal through signal demodulation based on the fourth signal. In addition, the second device may alternatively determine the fourth signal based on the target signal through de-repetition. The fourth signal is in a form of a plurality of information blocks on which signal modulation is performed, and then the second device determines the third signal through signal demodulation based on the fourth signal. Step 1001 is an inverse operation corresponding to step 803, and an operation of step 1001 may be determined in reverse deduction based on the operation of step 803.

In this embodiment of this disclosure, a modulation manner used for signal demodulation may be a demodulation manner corresponding to ASK or another modulation manner. This is not specifically limited herein.

In this embodiment of this disclosure, a quantity of repetition times in the foregoing overview of the frequency spread transformation may be preset in advance, or may be generated and determined online. This is not specifically limited herein.

In this embodiment of this disclosure, the orthogonal spreading code used for the foregoing frequency spread transformation may be an orthogonal spreading code, for example, a complementary Gray code or a Walsh code. This is not specifically limited herein.

1002. The second device determines, based on the third signal, a second signal through linear decoding.

The second device determines, based on the third signal, the second signal in a linear decoding manner. Specifically, in this embodiment of this disclosure, the third signal is a signal obtained through linear encoding, and the third signal may be in a form of a plurality of information bits. Correspondingly, the second device performs linear decoding on the third signal by using a demodulation code corresponding to the third signal, to determine the second signal.

Specifically, as shown in step 802 in FIG. 8, the first device may perform linear code encoding on a plurality of information bits in the first signal to generate a plurality of information bits on which the linear code encoding is performed. Correspondingly, in this embodiment of this disclosure, step 1002 in which the second device obtains the second signal based on the third signal is an inverse operation of step 403, and an operation of step 1002 may be determined in reverse deduction based on the operation of step 802. Specifically, the second device is determined based on the third signal in a linear decoding manner.

In a possible implementation, the third signal is one corresponding high autocorrelation performance sequence code, and the second device may alternatively determine the second signal based on the third signal. In this possible implementation, the sequence code may be a corresponding high autocorrelation performance sequence code, for example, a ZC sequence, a Gold sequence, or a Barker sequence. This is not specifically limited herein.

In this embodiment of this disclosure, the first device may first perform linear encoding on the first signal, and then generate the second signal through repetition or frequency spread transformation. Correspondingly, the second device may first perform de-repetition or frequency despread transformation on the second signal, and then perform linear decoding to obtain the first signal. That is, step 1003 is performed first, and then step 1002 is performed.

In this embodiment of this disclosure, a demodulation code used for first linear code demodulation includes a PIE linear code or another code whose encoded bit is 1 or that uses another linear encoding manner in which a high level appears for a large quantity of times. This is not specifically limited herein.

1003. The second device determines transmission information based on the second signal through de-repetition or frequency despread transformation.

The second device determines the transmission information based on the second signal through de-repetition or frequency despread transformation. Specifically, the second device determines, through de-repetition or frequency despread transformation for the second signal, a plurality of corresponding information blocks on which repetition is performed for a determined quantity of times, and then determines the transmission information based on the plurality of corresponding information blocks on which repetition is performed for a preset quantity of times. The transmission information is a plurality of information bits that are not repeated.

In this embodiment of this disclosure, when the first device performs repetition or frequency spread transformation, specifically, the first device may first generate a plurality of corresponding same information bits based on at least one information bit in the transmission information and a determined quantity of repetition times. Then, the first device determines a first orthogonal spreading code based on linear encoding, and the first device multiplies the plurality of information bits by each element in a corresponding sequence of the first orthogonal spreading code, to obtain a plurality of information bits generated by spreading, where the plurality of information bits generated by spreading are the generated second signal. Correspondingly, the second device determines, through frequency despread transformation for the second signal, a plurality of corresponding information bits on which repetition is performed for a determined quantity of times, and then determines the transmission information based on the plurality of corresponding information bits on which repetition is performed for a determined quantity of times. Alternatively, the first device may not multiply the first orthogonal spreading code, and repeat only each bit in the transmission information based on the determined quantity of times. Correspondingly, the second device may alternatively determine the transmission information through de-repetition for the second signal. This is not specifically limited herein. In this embodiment of this disclosure, step 1003 shown in FIG. 10 is an inverse operation of step 801 shown in FIG. 8, and an operation of step 1003 may be determined in reverse deduction based on the operation of step 801.

In this embodiment of this disclosure, the first orthogonal spreading code used for the foregoing frequency spread transformation and frequency despread transformation may be an orthogonal spreading code and a corresponding despreading code, for example, a complementary Gray code or a Walsh code. This is not specifically limited herein.

In this embodiment of this disclosure, the first device generates the second signal through frequency spread transformation. Therefore, in one aspect, the target signal has a wider spectrum and a wider transmission bandwidth, that is, an information bandwidth. Therefore, the target signal has a stronger anti-interference capability, and a transmission distance of the target signal is greatly increased. In another aspect, because different first devices use different first spreading codes when performing frequency spread transformation, a wireless communication device that receives the target signal, that is, the second device, may distinguish between different signals accordingly. This effectively improves efficiency of receiving different signals by the wireless communication device at the same time, enables the target signal to have good confidentiality, and improves confidential communication capability of the target signal.

In this embodiment, the second device may be a wireless terminal, for example, an LTE assisting terminal, an NR assisting terminal, an assistant, a semi-active tag, an active tag, a wireless relay station, an LTE mobile phone, and an NR mobile phone. The first device may be an access network device, for example, a macro base station, a pole base station, a long term evolution (LTE) base station, an evolved base station (evolved NodeB, eNB), a wireless relay (Relay) station, a Femto base station, a Pico base station, and a next generation base station (next generation NodeB, gNB). This is not specifically limited herein.

Figure 11:
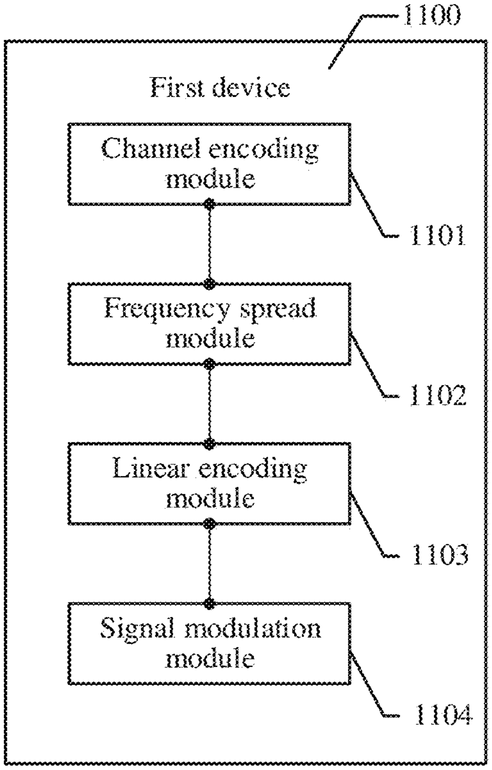
FIG. 11 is a schematic diagram of a structure of a first device according to an embodiment of this disclosure.

The following describes a signal generation device in embodiments of this disclosure. Refer to FIG. 11. A first device 1100 provided in an embodiment of this disclosure is a signal generation device. The first device may be the first device in FIG. 4. The first device 1100 includes the following.

A channel encoding module 1101 is configured to obtain a first signal based on transmission information through channel encoding, where the transmission information includes information that the first device needs to send to a second device.

The channel encoding module 1101 is specifically configured to:

obtain a prestored first signal through channel encoding based on the transmission information and a channel code; or generate the first signal online based on the transmission information and a channel code through channel encoding. For a specific implementation, refer to step 401 in the embodiment shown in FIG. 4. The step is that the first device obtains the first signal based on the transmission information through channel encoding. Details are not described herein again.

A frequency spread module 1102 is configured to generate a second signal through repetition or frequency spread transformation based on the first signal; The frequency spread module 1102 is specifically configured to:

generate, based on at least one information block or information bit in the first signal and a determined quantity of repetition times, a plurality of same information blocks or a plurality of same information bits, and multiply the plurality of same information blocks or the plurality of same information bits by a first spreading code, to generate the second signal; or generate, based on at least one information block or information bit in the first signal and a determined quantity of repetition times, a plurality of same information blocks or a plurality of same information bits, to generate the second signal. For a specific implementation, refer to step 402 in the embodiment shown in FIG. 4. The step is that the first device generates the second signal through repetition or frequency spread transformation. Details are not described herein again.

A linear encoding module 1103 is configured to generate a third signal based on the second signal through linear encoding.

The linear encoding module 1103 is specifically configured to:

generate the third signal based on the second signal and a target linear code through linear encoding. For a specific implementation, refer to step 403 in the embodiment shown in FIG. 4. The step is that the first device generates the third signal based on the second signal through linear encoding. Details are not described herein again.

A signal modulation module 1104 is configured to generate a target signal based on the third signal through signal modulation, where the target signal is sent to the second device. For a specific implementation, refer to step 404 in the embodiment shown in FIG. 4. The step is that the first device generates the target signal based on the third signal through signal modulation. Details are not described herein again.

In this embodiment, the first device may perform an operation performed by the first device in any one of the foregoing embodiments shown in FIG. 4. Details are not described herein again.

Figure 12:
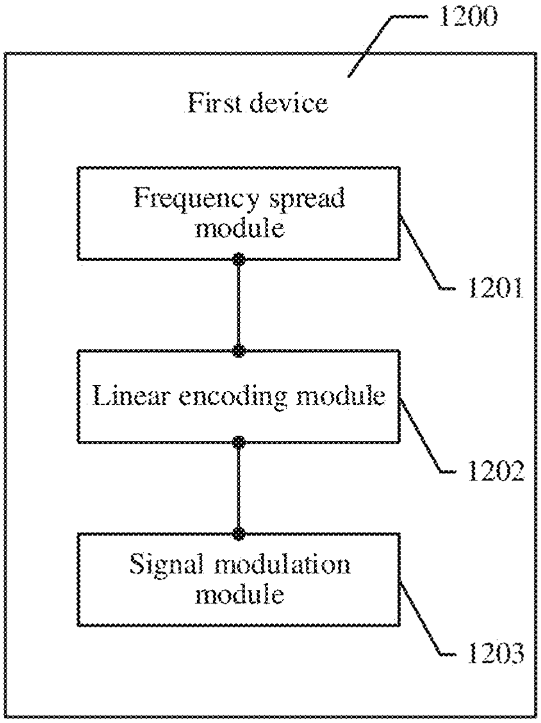
FIG. 12 is a schematic diagram of another structure of a first device according to an embodiment of this disclosure.

The following describes a signal generation device in embodiments of this disclosure. Refer to FIG. 12. A first device 1200 provided in an embodiment of this disclosure is a signal generation device. The first device may be the first device in FIG. 8. The first device 1200 includes the following.

A frequency spread module 1201 is configured to generate a second signal through repetition or frequency spread transformation based on transmission information.

The frequency spread module 1201 is specifically configured to:

generate, based on at least one information block or information bit in transmission information and a determined quantity of repetition times, a plurality of same information blocks or a plurality of same information bits, and multiply the plurality of same information blocks or the plurality of same information bits by a first spreading code, to generate the second signal; or generate, based on at least one information block or information bit in the first signal and a determined quantity of repetition times, a plurality of same information blocks or a plurality of same information bits, to generate the second signal. For a specific implementation, refer to step 801 in the embodiment shown in FIG. 8. The step is that the first device generates the second signal through repetition or frequency spread transformation. Details are not described herein again.

A linear encoding module 1202 is configured to generate a third signal based on the second signal through linear encoding.

The linear encoding module is specifically configured to:

generate the third signal based on the second signal and a target linear code through linear encoding. For a specific implementation, refer to step 802 in the embodiment shown in FIG. 8. The step is that the first device generates the third signal based on the second signal through linear encoding. Details are not described herein again.

A signal modulation module 1203 is configured to generate a target signal based on the third signal through signal modulation, where the target signal is sent to the second device. For a specific implementation, refer to step 803 in the embodiment shown in FIG. 8. The step is that the first device generates the target signal based on the third signal through signal modulation. Details are not described herein again.

In this embodiment, the first device may perform an operation performed by the first device in any one of the foregoing embodiments shown in FIG. 8. Details are not described herein again.

Figure 13:
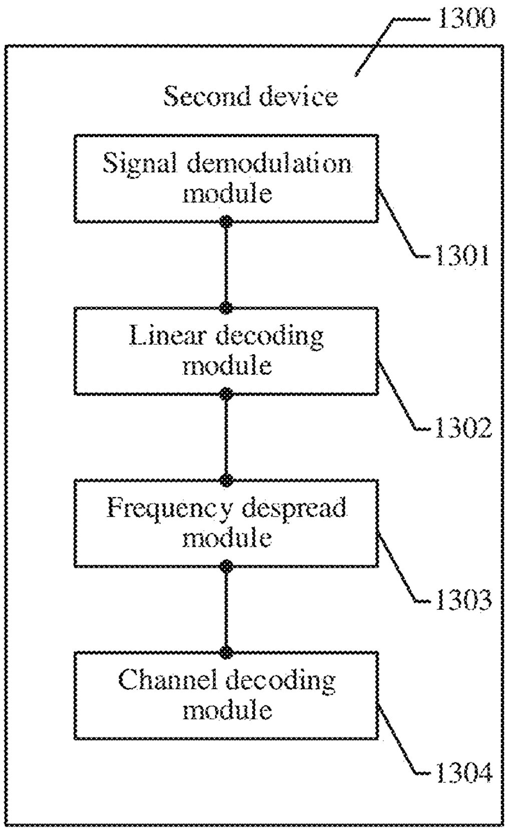
FIG. 13 is a schematic diagram of a structure of a second device according to an embodiment of this disclosure.

The following describes a signal processing device in embodiments of this disclosure. Refer to FIG. 13. A second device 1300 provided in an embodiment of this disclosure is a signal processing device. The second device may be the second device in FIG. 9. The second device 1300 includes the following.

A signal demodulation module 1301 is configured to determine a third signal through signal demodulation based on a target signal, where the target signal is a target signal sent by a first device and received by the second device. For a specific implementation, refer to step 901 in the embodiment shown in FIG. 9. The step is that the second device determines the third signal through signal demodulation based on the target signal. Details are not described herein again.

A linear decoding module 1302 is configured to determine a second signal based on the third signal through linear decoding. For a specific implementation, refer to step 902 in the embodiment shown in FIG. 9. The step is that the second device determines the second signal based on the third signal through linear decoding. Details are not described herein again.

A frequency despread module 1303 is configured to determine a first signal through de-repetition or frequency despread transformation based on the second signal. For a specific implementation, refer to step 903 in the embodiment shown in FIG. 9. The step is that the second device determines the first signal based on the second signal. Details are not described herein again.

A channel decoding module 1304 is configured to determine transmission information based on the first signal through channel decoding, where the transmission information includes information that the first device needs to send to the second device. For a specific implementation, refer to step 904 in the embodiment shown in FIG. 9. The step is that the second device determines the transmission information based on the first signal. Details are not described herein again.

In this embodiment, the second device may perform an operation performed by the second device in any one of the foregoing embodiments shown in FIG. 9. Details are not described herein again.

Figure 14:
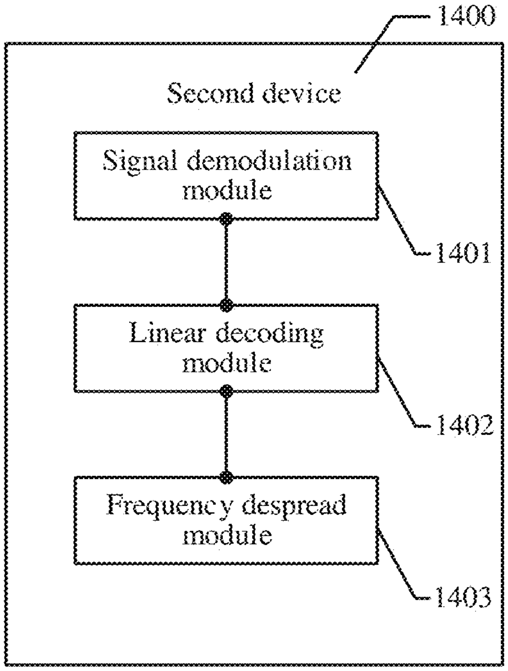
FIG. 14 is a schematic diagram of another structure of a second device according to an embodiment of this disclosure.

The following describes a signal processing device in embodiments of this disclosure. Refer to FIG. 14. A second device 1400 provided in an embodiment of this disclosure is a signal processing device. The second device may be the second device in FIG. 10. The second device 1400 includes the following.

A signal demodulation module 1401 is configured to determine a third signal through signal demodulation based on a target signal, where the target signal is a target signal sent by a first device and received by the second device. For a specific implementation, refer to step 1001 in the embodiment shown in FIG. 10. The step is that the second device determines the third signal through signal demodulation based on the target signal. Details are not described herein again.

A linear decoding module 1402 is configured to determine a second signal based on the third signal through linear decoding. For a specific implementation, refer to step 1002 in the embodiment shown in FIG. 10. The step is that the second device determines the second signal based on the third signal through linear decoding. Details are not described herein again.

A frequency despread module 1403 is configured to determine a first signal through de-repetition or frequency despread transformation based on the second signal. For a specific implementation, refer to step 1003 in the embodiment shown in FIG. 10. The step is that the second device determines transmission information based on the second signal. Details are not described herein again.

In this embodiment, the second device may perform an operation performed by the second device in any one of the foregoing embodiments shown in FIG. 10. Details are not described herein again.

Figure 15:
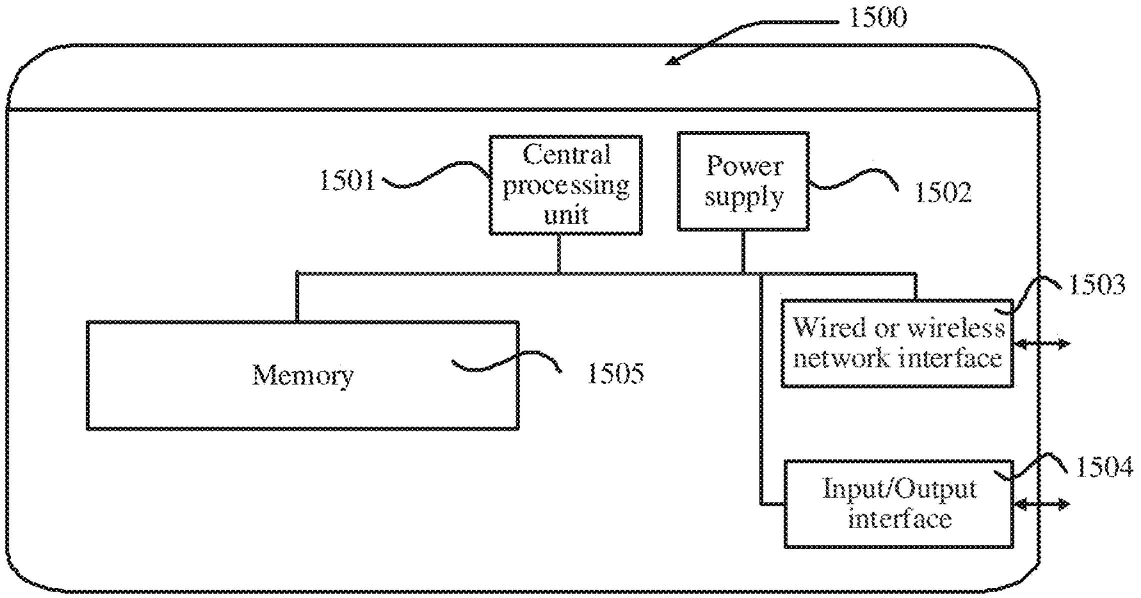
FIG. 15 is a schematic diagram of another structure of a first device according to an embodiment of this disclosure.

FIG. 15 is a schematic diagram of a structure of a first device according to an embodiment of this disclosure. The first device 1500 may include one or more central processing units (CPUs) 1501 and a memory 1505. The memory 1505 stores one or more application programs or data.

The memory 1505 may be volatile storage or persistent storage. A program stored in the memory 1505 may include one or more modules, and each module may include a series of instruction operations for the first device. Further, the central processing unit 1501 may be configured to communicate with the memory 1505, and perform, on the first device 1500, a series of instruction operations in the memory 1505.

The central processing unit 1501 is configured to execute a computer program in the memory 1505, so that the first device 1500 is configured to perform the following steps. The first device obtains, based on transmission information, a first signal through channel encoding, where the transmission information includes information that the first device needs to send to a second device. The first device generates, based on the first signal, a second signal through repetition or frequency spread transformation. The first device generates, based on the second signal, a third signal through linear encoding. The first device generates, based on the third signal, a target signal through signal modulation, where the target signal is sent to the second device. For a specific implementation, refer to steps 401 to 404 in the embodiment shown in FIG. 4 or steps 801 to 803 shown in FIG. 8. Details are not described herein again.

The first device 1500 may further include one or more power supplies 1502, one or more wired or wireless network interfaces 1503, one or more input/output interfaces 1504, or one or more operating systems such as Windows Server™, Mac OS X™, Unix™, Linux™, or FreeBSD™.

The first device 1500 may perform operations performed by the first device in the embodiment shown in FIG. 4 or FIG. 8. Details are not described herein again.

Figure 16:
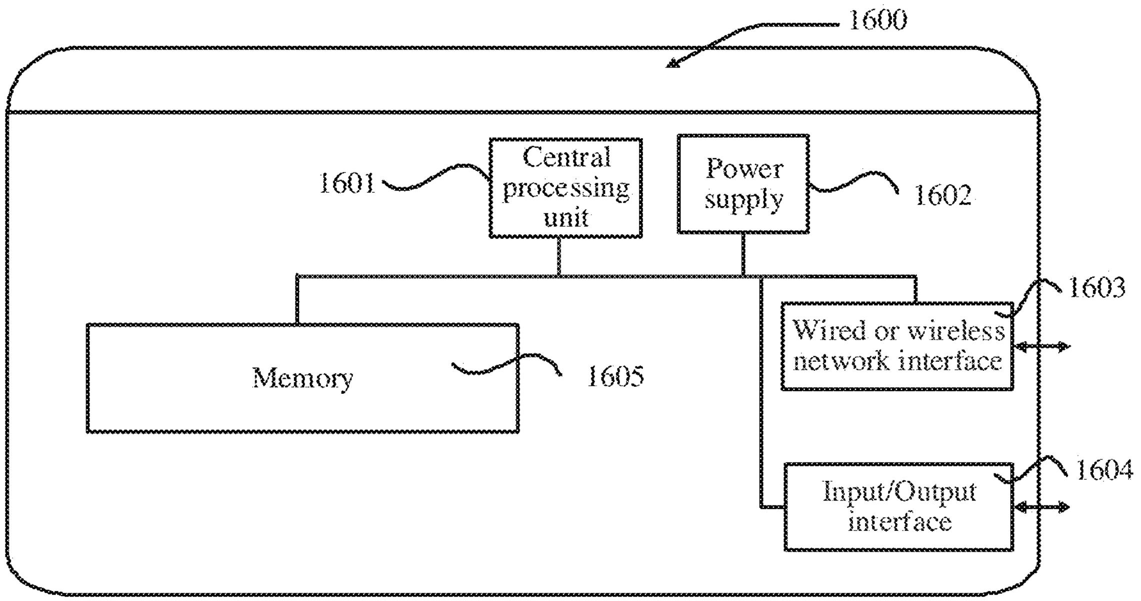
FIG. 16 is a schematic diagram of another structure of a second device according to an embodiment of this disclosure.

FIG. 16 is a schematic diagram of a structure of a second device according to an embodiment of this disclosure. The second device 1600 may include one or more central processing units (CPUs) 1601 and a memory 1605. The memory 1605 stores one or more application programs or data.

The memory 1605 may be volatile storage or persistent storage. A program stored in the memory 1605 may include one or more modules, and each module may include a series of instruction operations for the second device. Further, the central processing unit 1601 may be configured to communicate with the memory 1605, and perform, on the second device 1600, a series of instruction operations in the memory 1605.

The central processing unit 1601 is configured to execute a computer program in the memory 1605, so that the second device 1600 is configured to perform the following steps. The second device determines a third signal through signal demodulation based on a target signal, where the target signal is sent by a first device. The second device determines a second signal based on the third signal through linear decoding. The second device determines a first signal through de-repetition or frequency despread transformation based on the second signal. The second device determines, through channel decoding, transmission information based on the first signal, where the transmission information includes information that the first device needs to send to the second device. For a specific implementation, refer to steps 901 to 904 in the embodiment shown in FIG. 9 or steps 1001 to 1003 shown in FIG. 10. Details are not described herein again.

The second device 1600 may further include one or more power supplies 1602, one or more wired or wireless network interfaces 1603, one or more input/output interfaces 1604, or one or more operating systems such as Windows Server™, Mac OS X™, Unix™, Linux™, or FreeBSD™.

The second device 1600 may perform operations performed by the second device in the embodiment shown in FIG. 9 or FIG. 10. Details are not described herein again.

Figure 17:
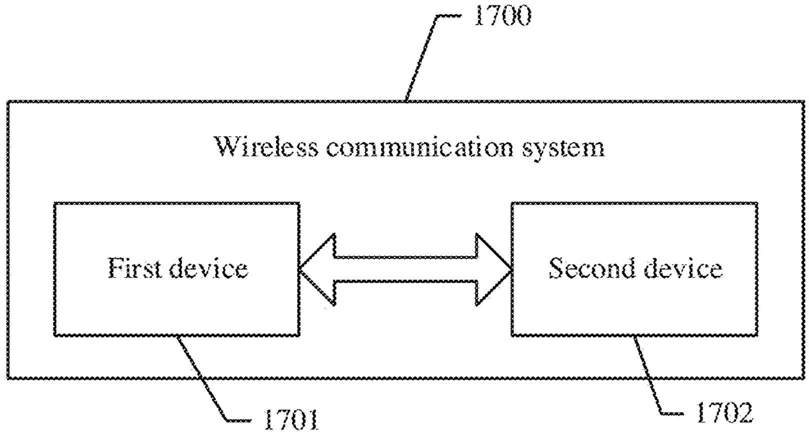
FIG. 17 is a schematic diagram of a structure of a wireless communication system according to an embodiment of this disclosure.

FIG. 17 shows a wireless communication system 1700 according to an embodiment of this disclosure. The system includes a first device 1301 and a second device 1702. The first device 1301 may perform operations performed by the wireless communication device in the embodiment shown in any one of FIG. 4 and FIG. 8, and the second device 1302 may perform operations performed by the wireless communication device in the embodiment shown in any one of FIG. 9 and FIG. 10. For a specific implementation, refer to steps 401 to 404 in the embodiment shown in FIG. 4 or steps 801 to 803 in the embodiment shown in FIG. 8, and steps 901 to 904 in the embodiment shown in FIG. 9 or steps 1001 to 1003 shown in FIG. 10. Details are not described herein again.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this disclosure. The foregoing storage medium includes any medium that can store program code, such as a USB flash drive, a removable hard disk, a read-only memory (ROM), a random access memory (RAM), a magnetic disk, or an optical disc.

What is claimed is:

1. A signal generation method, wherein the method comprises:

obtaining, at a first device, a first signal by channel encoding based on transmission information, wherein the transmission information comprises information for a second device;

generating, at the first device, a second signal by repetition or frequency spread transformation based on the first signal;

generating, at the first device, a third signal by linear encoding based on the second signal, wherein the third signal has a higher level frequency than the second signal, and wherein the linear encoding comprises transforming each bit of the second signal into a signal segment comprising at least two different signal levels;

generating, at the first device, a target signal by signal modulation based on the third signal; and sending, by the first device, the target signal to the second device.

2. The method according to claim 1, wherein the obtaining, at a first device, a first signal by channel encoding based on transmission information comprises:

obtaining, by the first device, the first signal prestored by the first device, through the channel encoding; or generating, by the first device, the first signal online through the channel encoding.

3. The method according to claim 2, wherein the channel encoding comprises Polar encoding or Low Density Parity Check Code (LDPC) encoding.

4. The method according to claim 1, wherein the first signal comprises at least one information block or information bit, and the generating, at the first device, a second signal by repetition or frequency spread transformation based on the first signal comprises:

generating, by the first device, a plurality of same information blocks or a plurality of same information bits based on the at least one information block or information bit in the first signal and a determined quantity of repetition times; or generating, by the first device, a plurality of same information blocks or a plurality of same information bits based on the at least one information block or information bit in the first signal and a determined quantity of repetition times, and multiplying, by the first device, the plurality of same information blocks or the plurality of same information bits by a first spreading code, to generate the second signal.

5. The method according to claim 4, wherein the first spreading code comprises a complementary Gray code, a Walsh code, or a Huffman code.

6. The method according to claim 1, wherein the generating, at the first device, the third signal by linear encoding based on the second signal comprises:

generating, by the first device, the third signal based on the second signal and a linear code.

7. The method according to claim 6, wherein the linear code comprises an FM0 linear code, a Miller linear code, a PIE linear code, or a Manchester linear code.

8. The method according to claim 1, wherein a modulation scheme of the generating, at the first device, a target signal by signal modulation of the third signal comprises binary phase shift keying (BPSK) signal modulation and amplitude shift keying (ASK) signal modulation.

9. A signal processing method, wherein the method comprises:

determining, at a second device, a third signal by signal demodulation based on a target signal, wherein the target signal is from a first device;

determining, at the second device, a second signal by linear decoding based on the third signal, wherein the third signal has a higher-level frequency than the second signal, and wherein the linear decoding comprises transforming each signal segment comprising at least two different signal levels into a bit of the second signal;

determining, at the second device, a first signal through de-repetition or frequency despread transformation based on the second signal; and determining, at the second device, transmission information through channel decoding based on the first signal, wherein the transmission information comprises information for the second device.

10. A first device, comprising:

at least one processor; and a memory coupled to the at least one processor and having program instructions stored thereon which, when executed by the at least one processor, cause the first device to:

obtain a first signal through channel encoding based on transmission information, wherein the transmission information comprises information for a second device;

generate a second signal through repetition or frequency spread transformation based on the first signal;

generate a third signal through linear encoding based on the second signal, wherein the third signal has a higher-level frequency than the second signal, and wherein the linear encoding comprises transforming each bit of the second signal into a signal segment comprising at least two different signal levels; and generate a target signal through signal modulation based on the third signal, wherein the target signal is sent to the second device.

11. The first device according to claim 10, wherein the obtaining a first signal through channel encoding transmission information comprises:

obtaining the first signal prestored by the first device, through the channel encoding; or generating the first signal online through the channel encoding.

12. The first device according to claim 11, wherein the channel encoding comprises Polar encoding or Low Density Parity Check Code (LDPC) encoding.

13. The first device according to claim 10, wherein the first signal comprises at least one information block or information bit, and the generating a second signal through repetition or frequency spread transformation of the first signal comprises:

generating, based on the at least one information block or information bit in the first signal and a determined quantity of repetition times, a plurality of same information blocks or a plurality of same information bits; or generating, based on the at least one information block or information bit in the first signal and a determined quantity of repetition times, a plurality of same information blocks or a plurality of same information bits, and multiplying, the plurality of same information blocks or the plurality of same information bits by a first spreading code, to generate the second signal.

14. The first device according to claim 13, wherein the first spreading code comprises a complementary Gray code, a Walsh code, or a Huffman code.

15. The first device according to claim 10, wherein the generating the third signal through linear encoding based on the second signal comprises:

generating, based on the second signal and a linear code, the third signal.

16. The first device according to claim 15, wherein the linear code comprises an FM0 linear code, a Miller linear code, a PIE linear code, or a Manchester linear code.

17. The first device according to claim 10, wherein a modulation scheme of the generating a target signal through signal modulation based on the third signal comprises binary phase shift keying (BPSK) signal modulation and amplitude shift keying (ASK) signal modulation.

18. The first device according to claim 10, wherein the first device is a terminal or a chip system in the terminal.

19. A second device, comprising:

at least one processor; and a memory coupled to the at least one processor and having program instructions stored thereon which, when executed by the at least one processor, cause the second device to:

determine a third signal through signal demodulation based on a target signal, wherein the target signal is sent by a first device;

determine a second signal through linear decoding based on the third signal, wherein the third signal has a higher-level frequency than the second signal, and wherein the linear decoding comprises transforming each signal segment comprising at least two different signal levels into a bit of the second signal;

determine a first signal through de-repetition or frequency despread transformation based on the second signal; and determine transmission information through channel decoding based on the first signal, wherein the transmission information comprises information from the first device.

* * * * *